March 12, 1957    O. VON ZELEWSKY    2,784,648
MACHINE TOOL FOR PRODUCING BLADES OF
CENTRIFUGAL MACHINES Filed April 26, 1954      5 Sheets-Sheet 1

INVENTOR:
Ottomar von Zelewsky
By Richards & Geier
Attorneys

INVENTOR:
Ottomar von Zelewsky
By
Richards & Geier
Attorneys

# United States Patent Office 2,784,648
Patented Mar. 12, 1957

2,784,648

MACHINE TOOL FOR PRODUCING BLADES OF CENTRIFUGAL MACHINES

Ottomar von Zelewsky, Neuhausen am Rheinfall, Switzerland, assignor to Georg Fischer Aktiengesellschaft, Schaffhausen, Switzerland, a Swiss company Application April 26, 1954, Serial No. 425,573

Claims priority, application Switzerland April 28, 1953

4 Claims. (Cl. 90—13)

The present invention relates to a machine tool for producing the blades of centrifugal machines by the copying process. Machine tools for copying blades, those of gas turbines for instance, from a templet have already been designed such that the blades and templets are rotated during machining about parallel axes running in the longitudinal direction of the said blades and templets. If machining advances parallel to the abovementioned axes of rotation of the workpiece and templets, the machining of the blade root and of a possible blade head presents great difficulties.

The machine tool envisaged in the present invention for producing blades of centrifugal machines on the copying process is characterized by the fact that the blades and templets are mounted on the machine frame and driven in such a way that during machining they are swivelable to and fro in a reciprocatory motion about parallel axes running in their longitudinal direction, furthermore that the machining tools are arranged on a tool slide which can be moved parallel to at least one caliper slide, machining being advanced in the direction of the axis of the blade by swivelling a guide piece which is slewable about an axis running transverse to the axes of rotation of the blade, means being provided to clear the tools from the workpiece during the return swivelling movement.

The drawings illustrate several typical embodiments of the invention.

Figure 1:
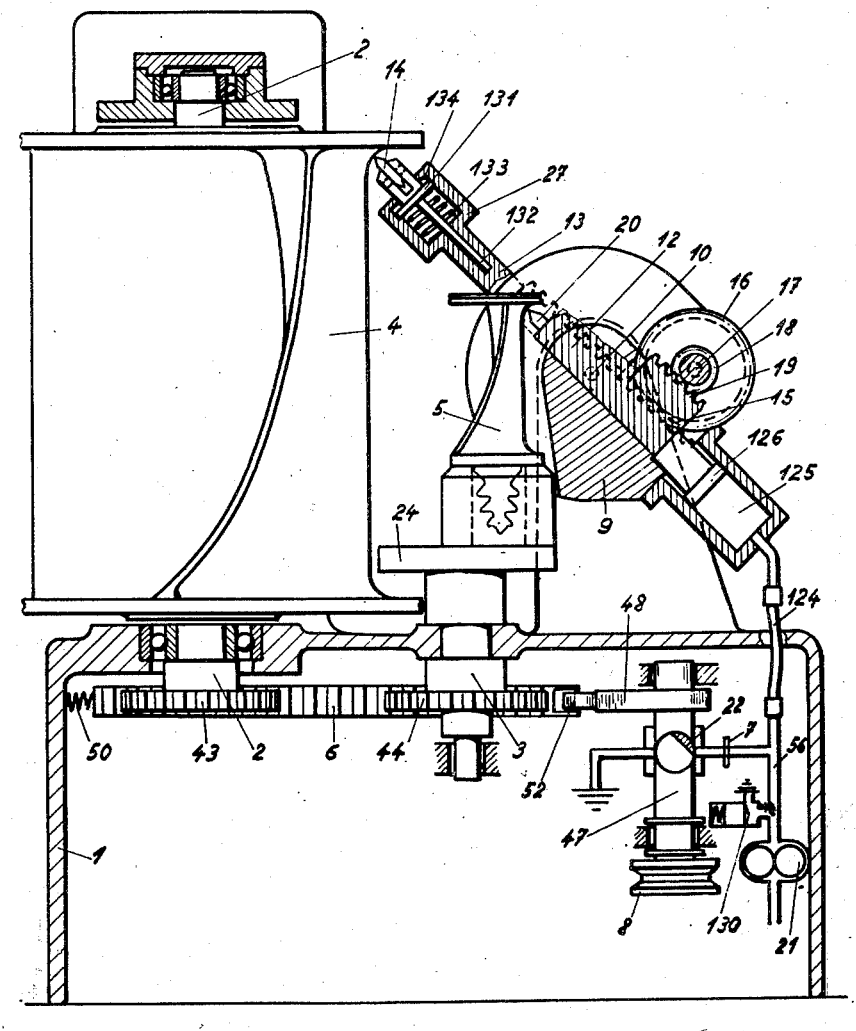
Fig. 1 is a cross-section through a machine for shaping the outer surface.
Figure 2:
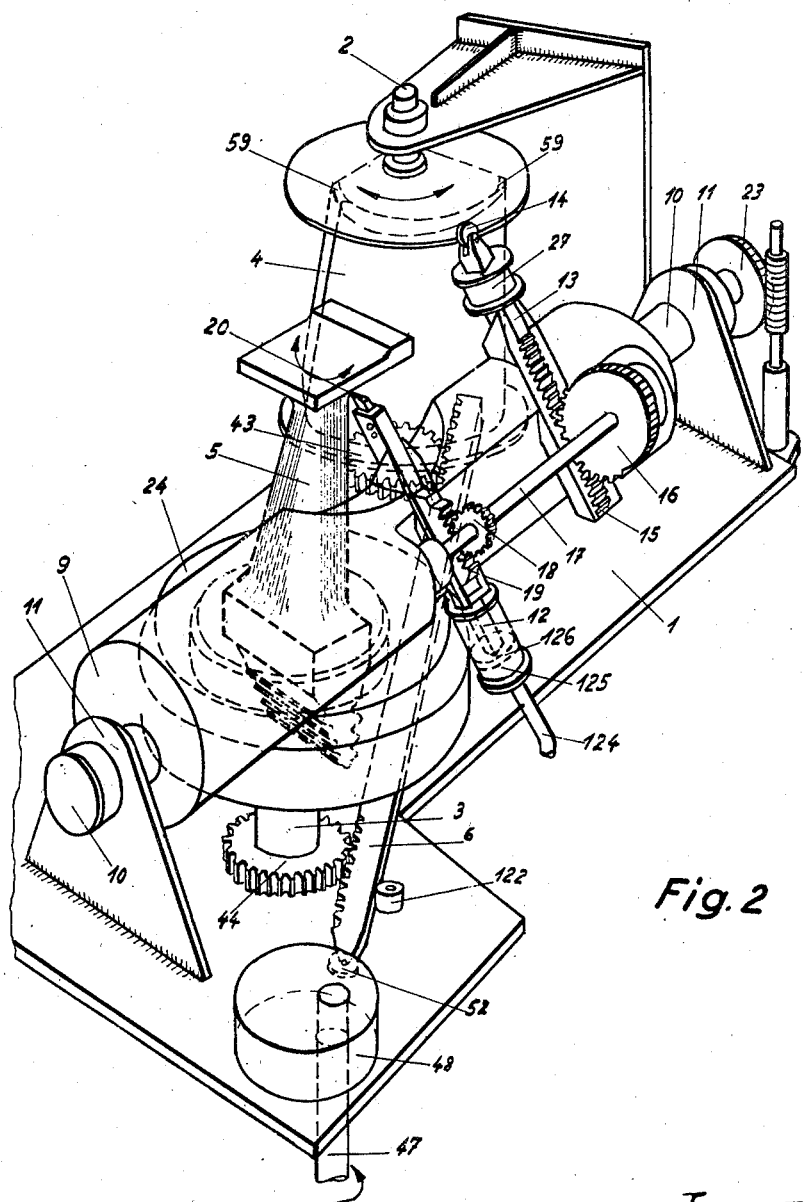
Fig. 2 is a view in perspective of the machine shown in Fig. 1.

In Figs. 1 and 2 the reference number 1 designates a machine tool housing in which the arbors 2 and 3 are mounted parallel to one another. The templet 4 can be swivelled about the arbor 2 and the workpiece 5 about the arbor 3, the said workpiece being machined into the shape of the blade in accordance with the pattern of the templet 4. In the typical embodiment illustrated the templet 4 is shown on a scale enlarged in the ratio of 3:1. Mounted on the arbors 2 and 3 are gear-wheels 43, 44 which mesh with a rack 6. The latter is guided by pressure rollers 122. By means which are not illustrated, a motor for instance, a V-belt pulley 8, which is mounted on a shaft 47 possessing a cam 48, is driven via a gear. A spring 50, illustrated in Fig. 4, presses the rack 6 against the cam 48 with the aid of a roller 52. A guide piece 9 is swivelable about an arbor 10 which is mounted in the two bearings 11. A tool slide 12 and a caliper slide 13 are mounted in the guide piece 9. In the caliper slide 13 a tracer roller 14 is supported in a cylinder 27 on a piston 131 with stem 132. In the positions illustrated in Figs. 1 and 4 the stem 132 is located in the bottom of the bore. A spring 133 presses the piston 131 against a stop 134. A rack 15 rigidly connected to the caliper slide 13, engages with a gearwheel 16 and transmits the movements of the caliper slide 13 via a shaft 17 to a gear-wheel 18. The latter meshes with a rack 19 which is rigidly connected to the tool slide 12. A tool 20 is supported on the front end of the tool slide 12. The ratio between the diameters of the gear-wheels 16 and 18 is the same as that between the templet 4 and the workpiece 5. A pump 21, shown in Fig. 4, forces a pressure medium into the two pressure conduits 56, 57. The pressure conduit 56 is connected via a hose 124 to a cylinder 125. A piston 126, which is connected to the tool slide 19, projects into the said cylinder 125. The pressure conduit 57 is connected via a hose 127 to a cylinder 128 in which a piston 129 is longitudinally shiftable and is connected to a tool slide 41. A pressure governor valve 130 regulates the pressure in the two conduits 56, 57. A cock 22 is coupled to the arbor 47 and a variable diaphragm 7 is interposed between the pressure conduit 57 and the cock 22. A worm gearing 23 is arranged at the end of the arbor 10 so as to cause the advance motion by swivelling the guide piece 9; the latter may be swivelled here through a sector of approximately 90°.

The typical embodiment shown in Figs. 1 and 2 operates as follows:

After the templet 4, which is provided at both ends with so-called run-out curves 59, has been clamped in position, and after the workpiece 5 has been secured to the table 24, the guide piece 9 is set in the starting position for machining. The axis of swivel 10 of the guide piece 9 is arranged so that it coincides approximately with the point of intersection made by the line bisecting the head and root parts of the blade and the generator of the blade profile. In the position of the tool and caliper slides 12 and 13, as shown in Figs. 1 and 2, the bearings 11, or the axis of swivel 10, must be adjusted to the axes of swivel 2 and 3 of the templet 4 and the workpiece 5 in such a way that in this position the two slides have their maximum stroke. This adjustment is made in the usual way and is therefore not illustrated in Figs. 1 and 2. After the axis of swivel 10 of the guide piece 9 has been set, machining can begin on the blade head. Chips are removed while the templet 4 and the workpiece 5 swivel synchronously and the templet 4 is mechanically marked off, starting for instance from the topmost part of the blade 5. The swivelling of the guide piece 9, driven by the worm gearing 23, produces the advance motion. The pump 21, which is permanently connected up, forces a pressure medium, which is maintained at constant pressure by the governor valve 130, into the conduit 56. A motor, which is not illustrated, distributes a rotary movement via a gear to the shaft 47 and thus to the cam 48 and the cock 22. At each revolution the cam 48 presses the rack 6 against the spring 50 and thus causes the rack 6 to move to and fro, whereby the arbors 2 and 3 are made to swivel. In this way, both the templet 4 and the blade 5 are swivelled during machining in a reciprocating, to and fro movement about parallel axes running in their longitudinal direction.

Synchronously with the rotary movement of the cam 48, and thus also with the swivelling movements of the templet 4 and the blade 5, the cock 22 opens and closes a pressure outlet opening from the conduit 57 behind the diaphragm 7. In this manner pressure impacts are produced in the cylinders 125, 128 (Fig. 4) which impacts press the piston 126 forwards, i. e. towards the blade 5, while the latter is carrying out its forward swivelling movement. The extent of this displacement of the piston 126 is, however, determined by the tracer roller 14. When the tool slide 12 is displaced, the caliper slide 13 is pressed against the templet 4 via the gear-wheels 18, 16 and the shaft 17. Since the pressure exerted by the pump 21 on the caliper slide 13 is greater than the pressure applied to the piston 131 by the spring 133, the piston 131 will occupy, during the forward, or working, movement in the machining process, the position illustrated in Figs. 1 and 4, where the stem 132 is at the bottom of the bore.

After the removal of chips has been completed, i. e. at the end of the forward movement of the blade 5, the pressure in the cyinder 125 is lowered. The spring 133 is now able to overcome the pressure of the cylinder 125 and thereby causes the tool 20 to be cleared from the blade 5 during the latter's return swivel.

It is shown in the typical embodiment illustrated how the clearing of the tool 20 from the blade 5 is effected by hydraulic means. This clearing, however, could also be effected by suitable pneumatic, mechanical or electrical means.

Figure 3:
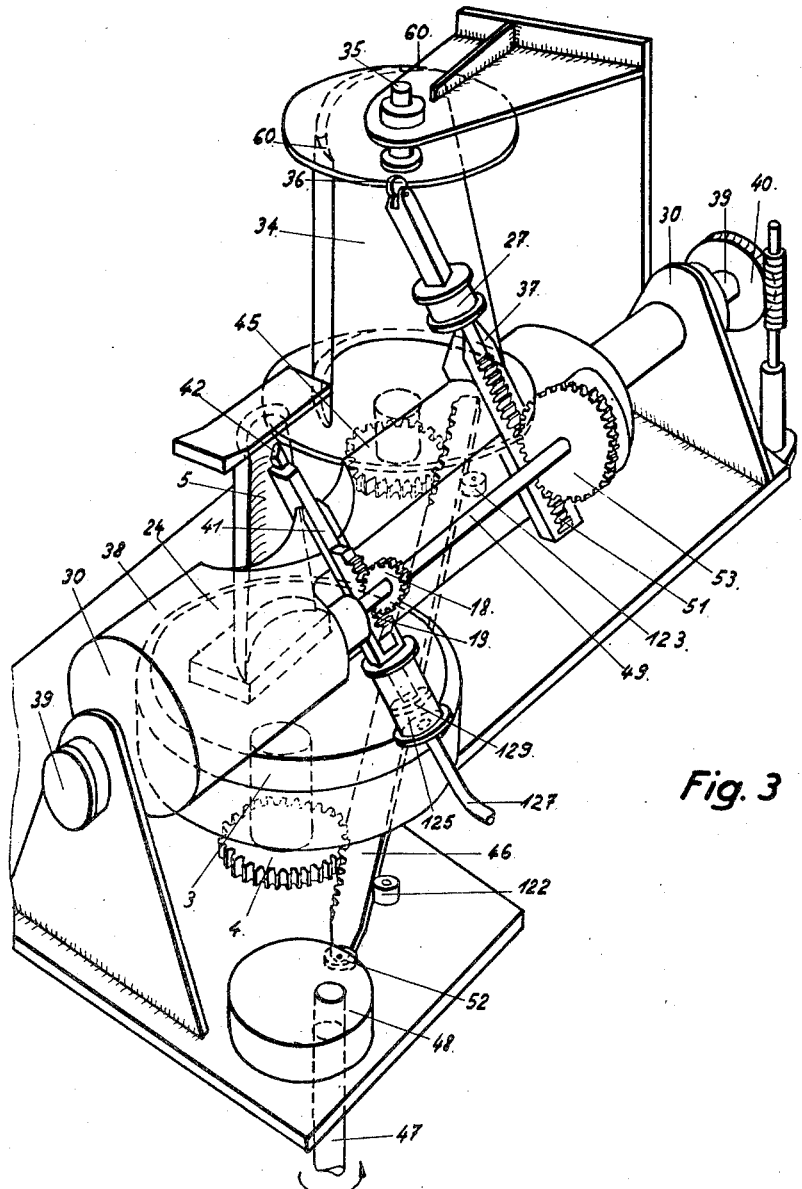
Fig. 3 is a view in perspective of the machine for shaping the inner surface.

Fig. 3 is a view in perspective of the machine for shaping the inner surface of a blade 5. The latter is swivelled on a work table 24 about an axis running in the longitudinal direction of the said blade. The number 32 designates the blade root and 33 the blade head. Machining is carried out in the mechanical copying process from a templet 34 which has so-called run-out curves at both ends and is synchronously swivelled about an axis 35 running parallel to the axis of rotation 3 of the blade 5. The templet 34 is marked off by a tracer roller 36. The latter projects from the front end of the caliper slide 37 which is arranged so that it is movable to and fro in the guide piece 38. In the caliper slide 37 there is located in a cylinder 31, as the case of the caliper slide 13, a piston 28 with a stem 29, both of which are pressed against a stop 25 by a spring 26. The guide piece 38 is mounted in the two bearings 30 so that it is swivelable about its axis 39. A worm gearing 40 is arranged so as to act as feed motion and swivel the guide piece 38 mechanically about the arbor 39. A tool slide 41 is slideably mounted in the guide piece 38. A tool 42 is supported on the front end of the tool slide 41. A rack 51 on the caliper slide 37 meshes with a pinion 53 on a shaft 49, on which is located another pinion 54 which engages with a rack 55 of the tool slide 41. The swivelling movement of the templet 34 and the tool 5 is brought about in a manner similar to that illustrated in Figs. 1 and 2. A rack 46, moved to and fro by a cam 48, meshes with gear-wheel 44 on the arbor 3 and gear-wheel 45 on the arbor 35.

The attachment, illustrated in Fig. 3, for shaping the inner surface of the blade 5 operates in exactly the same way as the attachment shown in Fig. 2, and here, too, the tool 42 is cleared from the blade 5 during the latter's return swivel.

Figure 4:
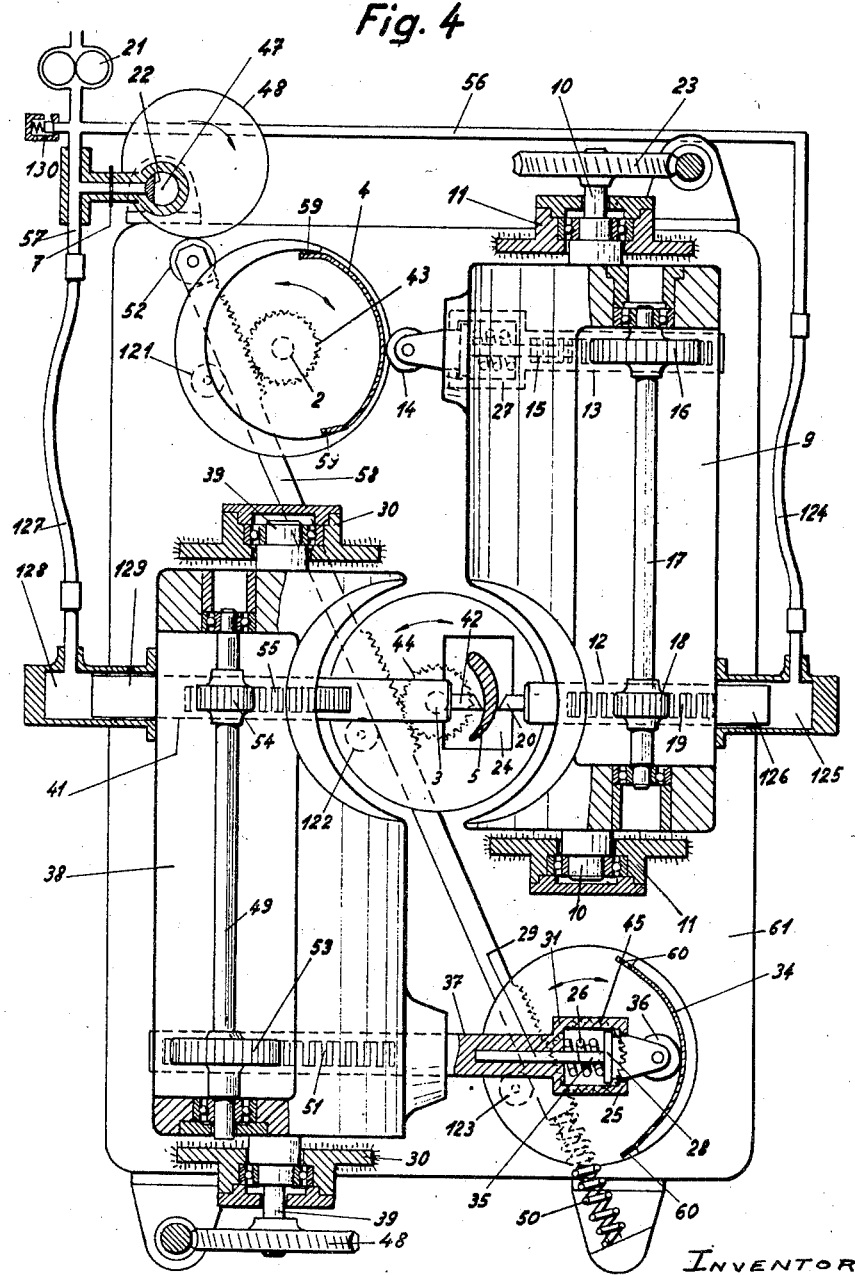
Fig. 4 is a horizontal projection of a machine for the simultaneous shaping of the outer and inner surfaces of the blade with the aid of cutting tools.

Fig. 4 shows a horizontal projection of a machine for the simultaneous shaping of the outer and inner surfaces of blades with the aid of lathe tools. Here, the copying attachments shown in Figs. 1, 2 and 3 are combined in one single machine. With a machine as shown in Fig. 4 the outer and inner surfaces of the blades can be shaped simultaneously by means of two units comprising caliper and tool slides. Arranged on a common base plate 61 is a copying attachment for shaping the outer surface of the blade 5, the separate parts of the said attachment being given the same reference numbers as in Figs. 1 and 2. The mode of operation as well corresponds exactly to that of the embodiment shown in Figs. 1 and 2. The copying attachment for shaping the inner surface of the blade 5 corresponds exactly to the embodiment shown in Fig. 3 and the component parts are accordingly given the same reference numbers as in Fig. 3. The two copying attachments are coupled together by the rack 58, which engages with the gear-wheels 43, 44, 45, and therefore operate synchronously. In addition, the two feed mechanisms 23 and 40 are similarly coupled together so that the machining of the inside and outside of the blade 5 proceeds uniformly and deformation of the blade resulting from tools advancing unevenly is prevented. The drive motor for producing the rotary movement of the cam 48, i. e. the swivelling movements of the templets 4 and 34 and of the blade 5, is not illustrated in Fig. 4, nor is the drive motor for feed mechanisms 23 and 40.

No further explanations about the mode of operation of the combined machine for producing blades according to Fig. 4 are necessary as the mode of operation of the separate attachments has already been described in detail in the foregoing.

Figure 5:
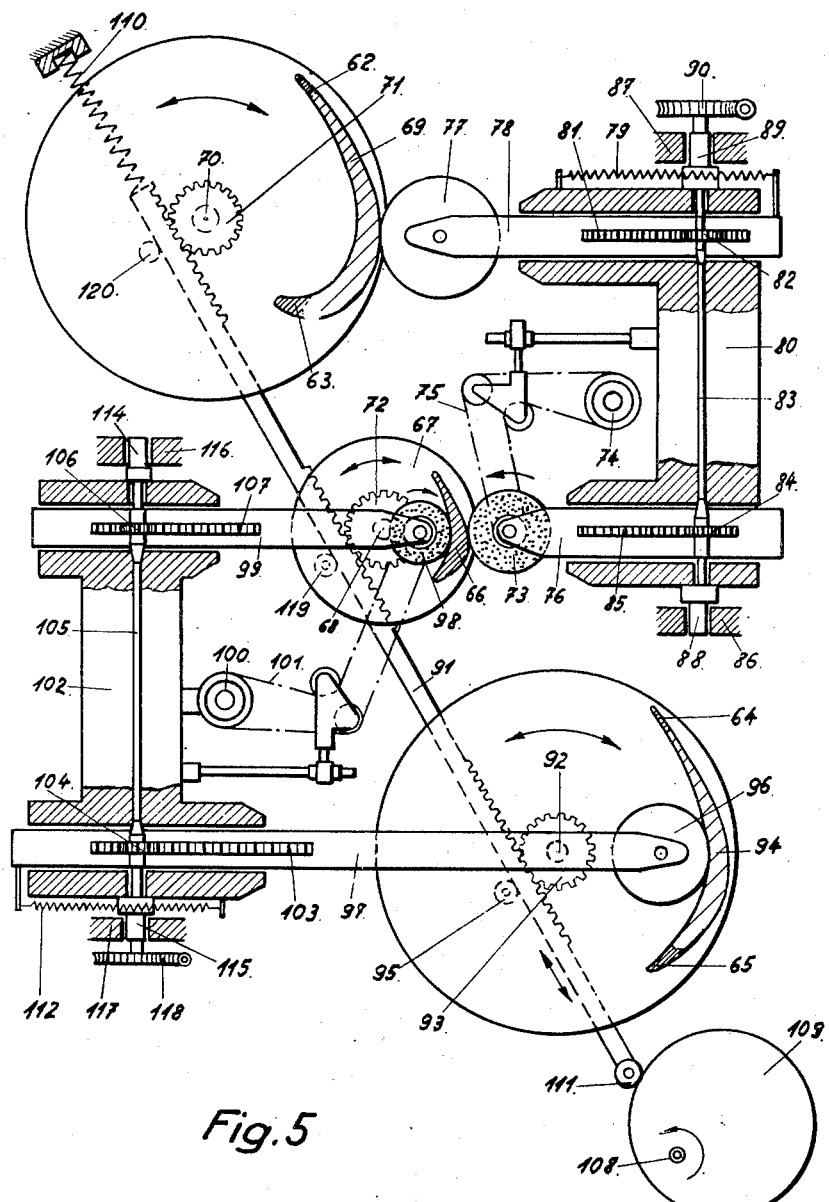
Fig. 5 is a horizontal projection of a machine for the simultaneous shaping of the outer and inner surfaces of the blade with the aid of grinding wheels.

Fig. 5 shows a typical embodiment of the invention for the simultaneous shaping of the outer and inner surfaces of blades with the aid of grinding wheels. The blade 66 is clamped to a small revolving table 67 and is swivelable with the said table about an arbor 68. The templet 69 for the outer shape is swivelable about the arbor 70 which is arranged parallel to the arbor 68. A grinding wheel 73 is the tool used for machining the blade 66. The grinding wheel 73 is driven by a motor 74 and a belt gearing 75, and is mounted in the tool slide 76. The approach of the grinding wheel 73 to the blade 66 is controlled by a tracer roller 77. In the typical embodiment illustrated a spring 79 acts as driving power for the caliper slide 78 and the tool slide 76. Both the tool slide 76 and the caliper slide 78 are mounted in the guide piece 80. The movement of the caliper slide 78 is transmitted to the tool slide 76 by a rack 81 and a pinion 82 meshing with the latter. The turning movement of the said pinion 82 is transmitted to a second pinion 84 via the shaft 83. The pinion 84 engages with a rack 85 which is secured to the tool slide 76. The guide piece 80, together with all the parts secured to it, is rotatably mounted in the bearings 86 and 87 by journals 88 and 89. A worm gearing 90 is arranged so as to swivel the guide piece 80, together with all the parts located in it, and thereby to produce the advance motion along the longitudinal axis of the blade.

The arbors 68, 70 and 92 are interconnected by a rack 91, which meshes with the gear-wheels 71, 72, 93 and is supported by rollers 95, 119 and 120. The arbor 92 likewise runs parallel to the arbor 68 and is the axis of swivel of the templet 94 for the inner shape of the blade 66. The templet 94 is marked off by means of a tracer roller 96 which is rotatably mounted on the front end of a caliper slide 97. The inner shape of the blade 66 is machined by a grinding wheel 98 which is rotatably arranged on the front end of the tool slide 99. The grinding wheel 98 is driven by a motor 100 with belt gearing 101. The caliper slide 97 and the tool slide 99 are mounted so that they are longitudinal shiftable in the guide piece 102. The movements of the caliper slide 97 are transmitted to the tool slide 99 via a rack 103, secured to the said caliper slide, and a pinion 104 meshing with the said rack. The pinion 104 is coupled to the pinion 106 by a shaft 105. The pinion 106 engages with a rack 107 which is secured to the tool slide 99.

In the typical embodiment illustrated a spring 112 acts as driving power for the caliper slide 97 and the tool slide 99. The guide piece 102 has two journals 114 and 115 and is swivelably mounted in the bearings 116 and 117. A worm gearing 118 causes the guide piece 102 to swivel in order to guide the tracer roller 96 and the grinding wheel 98 downwards. The swivelling movement of the templets 69 and 94 and of the blade 66 is caused by a cam 109 mounted on an arbor 108, the said arbor being driven by a motor which is not illustrated in Fig. 5. A spring 110 presses the rack 107, together with the roller 111, against the cam 109. The worm gearings 90 and 118, which simultaneously actuate the feed for the machining of the inner and outer surfaces of the blades, are likewise driven by a motor which is not illustrated in Fig. 5.

The templets 69 and 94 have at both ends so-called run-out sections 62, 63, 64, 65 which serve to guide the tracer rollers 77, 96 when the profiled ends of the blade 66 are being produced.

The mode of operation of the machine illustrated in Fig. 5 is, mutatis mutandis, exactly the same as that described in the foregoing for the machining of the outer surfaces of blades according to Figs. 1 and 2 and as that described for the machining of the inner surfaces of blades as shown in Fig. 3.

Instead of the cutting tools or grinding wheels shown in the typical embodiments illustrated in the drawing, other tools can also be used for machining the blades, such as, for instance, rotary milling cutters or suitable broaching tools. Similarly, it is possible with all the embodiments of the machine to drive the slides for the calipers and for the tools electrically, hydraulically or pneumatically, instead of by purely mechanical means. The number of blades to be produced simultaneously by each templet for the inner or outer shape is not restricted to one, but can be increased within certain limits.

Figs. 1 to 5 illustrate blades, the heads and roots of which are in planes at right angles to the longitudinal axis of the blades. By means of a machine according to the present invention, however, blades can also be produced which have, both at the head and at the root, surfaces arranged obliquely to the longitudinal axis of the blades. With the machines known hitherto for the same purpose blades of this sort could not be produced in one single operation.

The present invention is an improvement of that described in my co-pending patent application Serial No. 392,436, filed November 16, 1953.

What I claim is:

1. A template-copying machine tool for making individual rotor blades of centrifugal machines, said machine tool comprising a housing, means connected with said housing for swiveling a template and a work piece about fixed longitudinal axes, said axes being stationary and extending parallel to each other, a guide member swingably mounted in said housing, a feeler slide adapted to carry a feeler for engaging the template, said feeler slide being mounted upon said guide member for movement transverse to said guide member, a tool slide adapted to carry a tool for machining the work piece, said tool slide being mounted upon said guide member for movement transverse to said guide member, means adjustably connected with said feeler slide and said tool slide for jointly moving them in the transverse direction parallel to each other and transmitting movements of the feeler to the tool for corresponding movements, and means connected with said slides and adjusting the connection of said slides with the last-mentioned means for clearing the tool from the work piece during the return swivel of said guide piece.

2. A template-copying machine tool for making individual rotor blades of centrifugal machines, said machine tool comprising a housing, means connected with said housing for swiveling a template and a work piece about fixed longitudinal axes, said axes being stationary and extending parallel to each other, a guide member swingably mounted in said housing, a feeler slide adapted to carry a feeler for engaging the template, said feeler slide being mounted upon said guide member for movement transverse to said guide member, a tool slide adapted to carry a tool for machining the work piece, said tool slide being mounted upon said guide member for movement transverse to said guide member, means adjustably connected with said feeler slide and said tool slide for jointly moving them in the transverse direction parallel to each other and transmitting movements of the feeler to the tool for corresponding movements, a spring between the feeler and the feeler slide, and hydraulic means between the tool and the tool slide for adjusting the connection of said slides with the last-mentioned means for clearing the tool from the work piece during the return swivel of said guide piece.

3. A template-copying machine tool for making individual rotor blades of centrifugal machines, said machine tool comprising a housing, means connected with said housing for swiveling a template and a work piece about fixed longitudinal axes, said axes being stationary and extending parallel to each other, a guide member swingably mounted in said housing, a feeler slide comprising a cylinder, a piston within said cylinder, a spring engaging said piston, a feeler carried by said piston for engaging the template, said feeler slide being mounted upon said guide member for movement transverse to said guide member, a tool slide comprising a cylinder, a piston within said cylinder, a tool carried by said piston for machining the work piece, said tool slide being mounted upon said guide member for movement transverse to said guide member, rack-and-pinion means connected with said feeler slide and said tool slide for jointly moving them in the transverse direction parallel to each other and transmitting movements of the feeler to the tool for corresponding movements, hydraulic means connected with the cylinder of the tool slide, and means periodically actuating said hydraulic means to clear the tool from the work piece during the return swivel of said guide piece.

4. A template-copying machine tool for making individual rotor blades of centrifugal machines, said machine tool comprising a housing, means connected with said housing for swiveling two templates and a work piece about fixed longitudinal axes, said axes being stationary and extending parallel to each other, two guide members swingably mounted in said housing, a feeler slide adapted to carry a feeler for engaging one of said templates, said feeler slide being mounted upon one of said guide members for movement transverse to that guide member, a tool slide adapted to carry a tool for machining one side of the work piece, said tool slide being mounted upon said one guide member for movement transverse to said one guide member, means adjustably connected with said feeler slide and said tool slide for jointly moving them in the transverse direction parallel to each other and transmitting movements of the feeler to the tool for corresponding movements, another feeler slide adapted to carry a feeler for engaging the other one of said templates, said other feeler slide being mounted upon the other one of said guide members for movement transverse to that guide member, another tool slide adapted to carry a tool for simultaneously machining the other side of the work piece, said other tool slide being mounted upon said other guide member for movement transverse to said other guide member, means adjustably connected with said other feeler slide and said other tool slide for jointly moving them in the transverse direction parallel to each other and transmitting movements of the feeler to the tool for corresponding movements, and means connected with said slides and adjusting the positions of said slides for clearing the tools from the work piece during the return movements of said guide pieces.

References Cited in the file of this patent
UNITED STATES PATENTS

| | | |
|---|---|---|
| 1,999,787 | Sassen | Apr. 30, 1935 |
| 2,005,508 | Shaw | June 18, 1935 |
| 2,365,558 | King et al. | Dec. 19, 1944 |
| 2,610,447 | Bobbs | Sept. 16, 1952 |
| 2,645,967 | Von Zelewsky | July 21, 1953 |